United States Patent
Nishii et al.

(10) Patent No.: US 6,942,593 B2
(45) Date of Patent: Sep. 13, 2005

(54) TOROIDAL-TYPE CONTINUOUSLY VARIABLE TRANSMISSION

(75) Inventors: Hiroki Nishii, Kanagawa (JP); Masami Tanaka, Kanagawa (JP)

(73) Assignee: NSK Ltd., Tokyo (JP)

( * ) Notice: Subject to any disclaimer, the term of this patent is extended or adjusted under 35 U.S.C. 154(b) by 134 days.

(21) Appl. No.: 10/341,473

(22) Filed: Jan. 14, 2003

(65) Prior Publication Data

US 2003/0132051 A1 Jul. 17, 2003

(30) Foreign Application Priority Data

Jan. 17, 2002 (JP) ................................. P.2002-008353

(51) Int. Cl.$^7$ .............................................. F16H 15/38
(52) U.S. Cl. ......................... 476/40; 476/41; 384/623
(58) Field of Search .............................. 476/40, 41, 42, 476/46; 384/623

(56) References Cited

U.S. PATENT DOCUMENTS

| | | | |
|---|---|---|---|
| 5,027,668 A | * 7/1991 | Nakano | 476/8 |
| 5,669,274 A | 9/1997 | Yokoi et al. | |
| 5,803,861 A | * 9/1998 | Yamamoto | 476/40 |
| 6,176,805 B1 | * 1/2001 | Itoh et al. | 476/40 |
| 6,332,857 B1 | * 12/2001 | Ishikawa et al. | 476/41 |
| 6,520,888 B1 | * 2/2003 | Itoh et al. | 476/41 |

FOREIGN PATENT DOCUMENTS

| | | | |
|---|---|---|---|
| JP | 8-61452 A | | 3/1996 |
| JP | 8-200463 A | | 8/1996 |
| JP | 11-6550 A | | 1/1999 |
| JP | 11-63165 A | | 3/1999 |
| JP | 11-193856 A | | 7/1999 |
| JP | 11-201251 | * | 7/1999 |
| JP | 2003-314643 | * | 11/2003 |

* cited by examiner

Primary Examiner—William C. Joyce
(74) Attorney, Agent, or Firm—Sughrue Mion, PLLC (57) ABSTRACT

A toroidal-type continuously variable transmission has: an input shaft; an input side disk and an output side disk respectively disposed on the outer periphery of the input shaft, the input side disk including a first cam surface; and a loading cam device interposed between the input side and output side disks and comprising: a loading cam including a second cam surface and rotatable together with the input shaft; a plurality of rollers interposed rollably between the first cam surface and the second cam surface; and a retainer, the retainer including a retainer main body having a circular-shaped fitting hole, and inside-diameter side projecting portions disposed on a retainer main body for maintaining the attitude of the retainer main body, wherein inside diameters of portions of the fitting hole corresponding to the inside-diameter side projecting portions are larger than that of the remaining portions of the fitting hole.

2 Claims, 7 Drawing Sheets

PRIOR ART

FIG. 6B

PRIOR ART

FIG. 6C

PRIOR ART

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used as a transmission for a vehicle and, in particular, to an improvement in a retainer of a loading cam device which is incorporated into such toroidal-type continuously variable transmission.

2. Description of the Related Art

Figure 4:
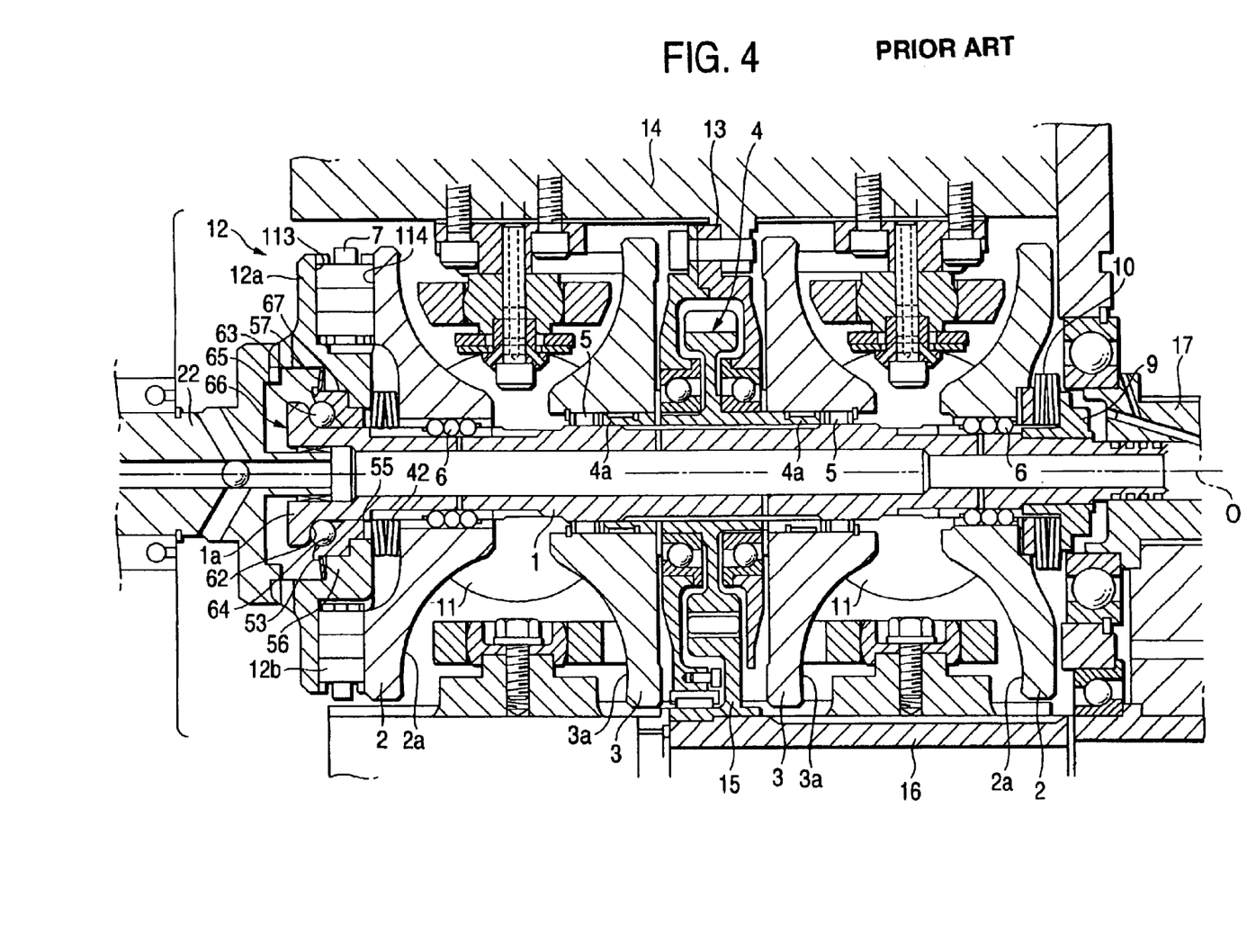
FIG. 4 is a section view of a conventional toroidal-type continuously variable transmission.

Now, FIG. 4 shows a conventional toroidal-type continuously variable transmission which can be used as a transmission for a vehicle. This is a so called double cavity type of toroidal-type continuously variable transmission for high torque, in which two input side disks 2, 2 and two output side disks 3, 3 are mounted on the outer periphery of an input shaft 1. Also, on the outer periphery of the middle portion of the input shaft 1, there is rotatably supported an output gear 4. The output gear 4 includes cylindrical-shaped flange portions 4a, 4a formed in the central portion thereof, while the output side disks 3, 3 are respectively coupled to the flange portions 4a, 4a of the output gear 4 through spline engagement.

Also, the input shaft 1 can be driven or rotated through a loading cam device 12 by a drive shaft 22. Specifically, the loading cam device 12 is interposed between the input shaft 1 and the input side disk 2 that is situated on the left in FIG. 4; and, while pressing the input side disk 2 elastically toward the output side disk 4, the loading cam device 12 can drive and rotate the input side disk 2. The loading cam device 12 is composed of a loading cam (cam plate) 12a rotatable together with the input shaft 1 and a plurality of (for example, three) rollers (rolling elements) 12b respectively held by the retainer 7 in such a manner that they are allowed to roll. In one side surface (in FIG. 4, the right side surface) of the loading cam 12a, there is formed a cam surface 113 consisting of an uneven surface (convex-and-concave surface) which extends in the circumferential direction of the loading cam 12a; and, in the outer surface (in FIG. 4, the left side surface) of the input side disk 2 as well, there is formed a cam surface 114 having a similar shape to the cam surface 113. By the way, the output gear 4 is supported on the interior of a housing 14 through a partition wall 13 which is constructed by coupling two members to each other, whereby the output gear 4 can be rotated about the axis O of the input shaft 1 but is prevented from shifting in the axis O direction.

The output side disks 3, 3 are supported by needle roller bearings 5, 5 interposed between the input shaft 1 and the output side disks 3, 3 in such a manner that they can be rotated about the axis O of the input shaft 1. Also, the input side disks 2, 2 are supported through ball splines 6, 6 on the two end portions of the input shaft 1 in such a manner that they can be rotated together with the input shaft 1. Further, between the inner surfaces (concave surfaces) 2a, 2a of the input side disks 2, 2 and the inner surfaces (concave surfaces) 3a, 3a of the output side disks 3, 3, there are rotatably interposed and held power rollers 11, respectively.

In the case of the input side disk 2 that is situated on the right side in FIG. 4, the back surface (in FIG. 4, the right surface) of the input side disk 2 is butted against a loading nut 9 through a countersunk plate spring 10 having large elasticity and thus the shift of the present input side disk 2 with respect to the input shaft 1 in the axial direction thereof (in FIG. 4, in the right and left direction) is substantially prevented. In the end portion of the input shaft 1, there is formed a flange portion 1a; and, in one side surface of the flange portion 1a, there is formed an angular type of inner raceway 62. And, between this inner raceway 62 and an angular type of outer raceway 64 formed in the inner peripheral surface of a bearing support member (outer ring) 63, there are inserted a plurality of balls 65. That is, the flange portion 1a, bearing support member 63 and balls 65 cooperate together in constituting an angular contact type of ball bearing 66 which is capable of supporting a thrust load.

In the outer peripheral surface of the bearing support member 63, there are formed a cylindrical surface 67 and a flange portion 53. And, in order that a cylindrical portion 56 formed in the diameter-direction middle portion of the loading cam 12a can be fitted with the outer surface of the cylindrical surface 67 with no shaky motion between them and shiftably in the axial direction of the loading cam 12a, a countersunk plate spring 57 for prevention of shaky motion is interposed between the flange portion 53 and the outer surface of the middle portion of the loading cam 12a.

Also, between the diameter-direction inner portion of the bearing support member 63 and input side disk 2, there are interposed a thrust needle roller bearing 55 and a countersunk plate spring 42 serving as a preload spring in such a manner that they are arranged in series with each other along the axial direction of the input shaft 1. The countersunk plate spring 42 is smaller in elasticity than the countersunk plate spring 10 and is able to apply a preload to the contact portions between the concave surfaces 2a, 2a, 3a, 3a of the disks 2, 2, 3, 3 and the peripheral surface of the power rollers 11, 11. That is, when the loading cam device 12 does not generate a thrust force, or when a thrust force is generated but it is small, the countersunk plate spring 42 secures the contact pressures of the respective contact portions so that small torque can also be transmitted by the toroidal-type continuously variable transmission.

Therefore, in the case of the above-structured continuously variable transmission apparatus, in case where rotational power is input to the input shaft 1 from the drive shaft 22, as the input shaft 1 is rotated, the loading cam 12a is rotated, the cam surface 113 presses the plurality of rollers 12b against the cam surface 114 formed in the outer surface of the input side disk 2. Due to this, the input side disk 2 is pressed against the plurality of power rollers 11 and, at the same time, based on the mutual pressing actions between the two cam surfaces 113, 114 and the plurality of rollers 12b, the input side disk 2 is rotated. And, the rotational power of the input side disk 2 is transmitted through the plurality of power rollers 11, 11 to the output side disk 4 with a given transmission ratio. Also, the rotational power of the output side disks 3, 3 is transmitted from the output gear 4 to the output shaft 17 through a transmission gear 15 and a transmission shaft 16.

Figure 5A:
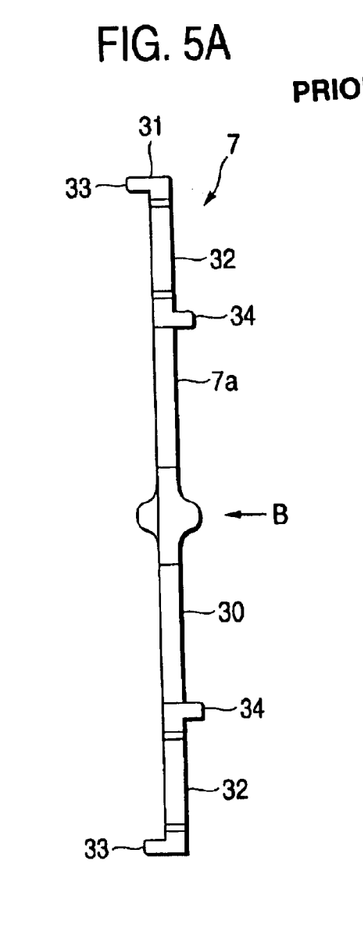
FIG. 5A is a longitudinal side view of a conventional retainer.
Figure 5B:
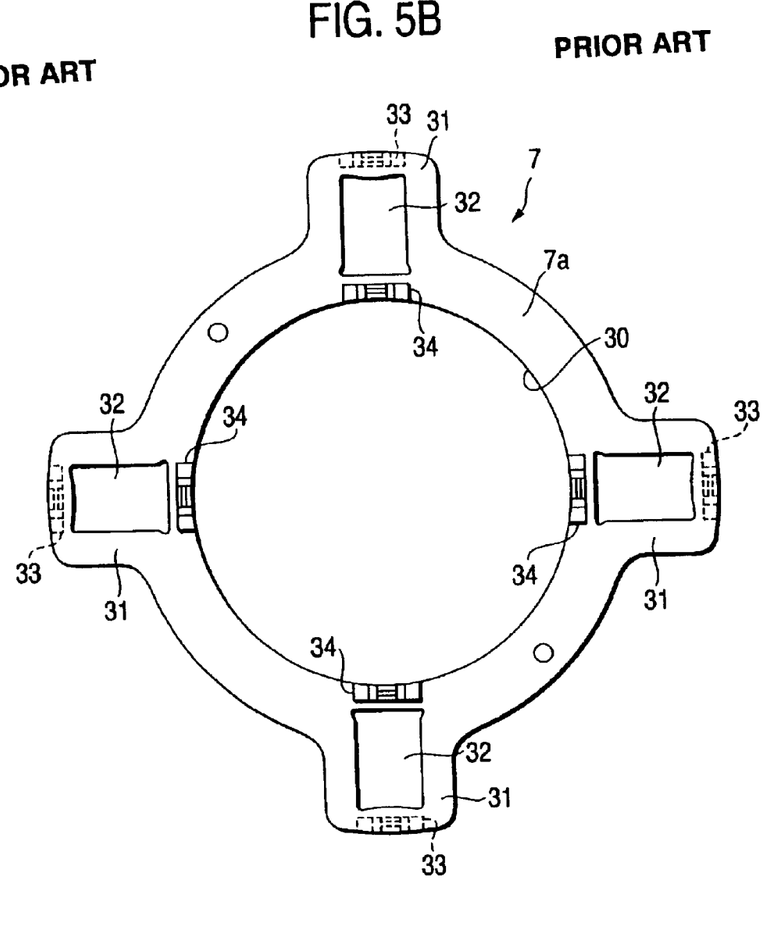
FIG. 5B is a view of the retainer taken along the arrow mark B shown in FIG. 5A.
Figure 6A:
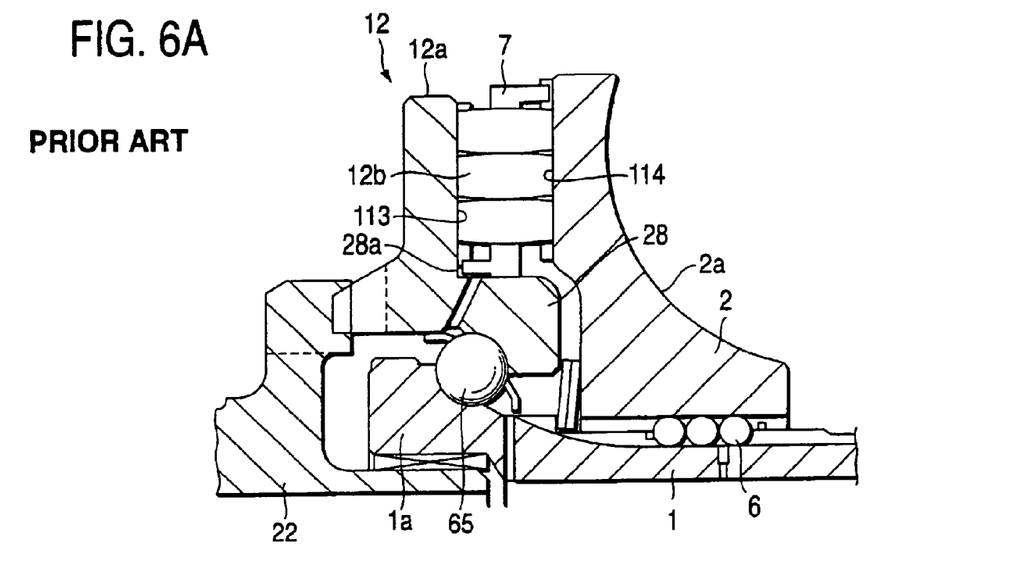
FIG. 6A is an enlarged section view of the main portions of the retainer shown in FIGS. 5A and 5B and a loading cam device, showing a state in which the retainer is incorporated into the loading cam device.

By the way, the retainer of the loading cam device 12 in the above-structured toroidal-type continuously variable transmission, as shown in FIGS. 5A and 5B, comprises a retainer main body 7a which is made of a metal plate having a circular-ring-like shape. Also, the retainer main body 7a includes in the central portion thereof a circular-shaped fitting hole 30 which can be fitted with a boss portion 28 (FIGS. 6A–6C) formed in the loading cam 12a. Also, in the outer peripheral portion of the retainer main body 7a, at regular intervals in the peripheral direction thereof, there are disposed e.g. four projecting portions 31 integrally therewith; and, in the respective projecting portions 31, there are formed pockets 32 respectively for holding their associated rollers 12b.

Figure 6B:
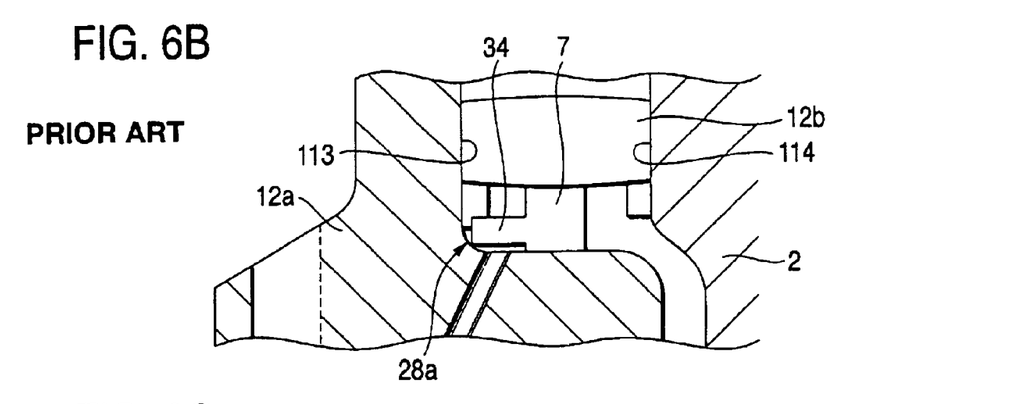
FIGS. 6B and 6C are section views of the periphery of the connecting portion of a loading cam employed in the loading cam device shown in FIG. 6A; and, FIGS. 7A and 7B are views of the process for molding the retainer shown in FIGS. 1A and 1B.
Figure 6C:
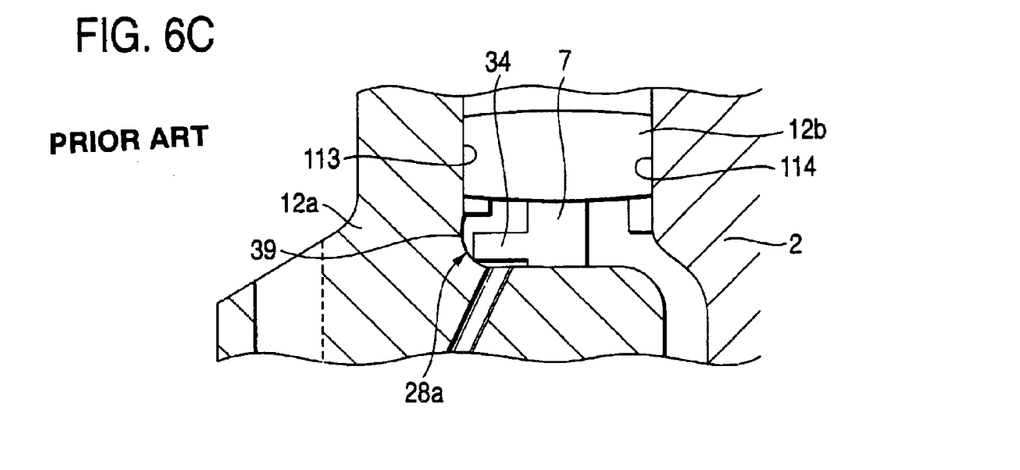

Also, as described above, in the case of the loading cam device 12, the uneven surface shape (convex-and-concave surface shape) of the cam surface 113 of the loading cam 12a presses the plurality of rollers 12b against the cam surface 114 of the input side disk 2. As a result of this, the inner peripheral surfaces 2a, 3a of the input side disk 2 and output side disk 3 are strongly pressed against the peripheral surfaces of the power rollers 11. Due to this, the loading cam 12a receives a strong force from the plurality of rollers 12b in the axial direction of the input shaft 1, which raises a problem as to the yield strength of the connecting portion (stepped portion—see FIG. 6A) 28a between the cam surface. 113 and boss 28 on which stresses are concentrated. Therefore, in order to enhance the yield strength of the connecting portion 28a, as shown in FIG. 6B, the connecting portion 28a is formed in an arc shape, or, as shown in FIG. 6C, there is formed an-arc-shaped relief portion 39 in the connecting portion 28a.

Also, in the loading cam device 12 having such structure, in case where torque is input to the loading cam 12a, the roller 12b climbs the cam surfaces 113, 114, while the distance between the loading cam 12a and input side disk 2 becomes large. Therefore, in order to prevent the retainer 7 from inclining even when the distance becomes large, not only, on the outer peripheral portions of the respective projecting portions 31 of the retainer main body 7a of the retainer 7, there are disposed outside-diameter-side projecting portions 33 which are respectively projected toward the input side disk 2, but also, on the inner peripheral portions of the fitting hole 30 that correspond to the projecting portions 31, there are disposed inside-diameter-side projecting portions 34 which are respectively projected toward the loading cam 12a side. That is, the retainer 7 includes, on the diameter-direction inside and outside surfaces thereof, the projecting portions 33, 34 which can prevent the retainer 7 from toppling down.

Since the projecting portions 33, 34 keep the inclination of the retainer 7 by maintaining the distance between the projecting portions 33, 34 and cam surfaces 113, 114, it is not preferable that the projecting portions 33, 34 drop down into the relief portions 39 formed in the loading cam 12a or they interfere with the arc-shaped connecting portions 28a. However, in case where the connecting portion 28a is formed in an arc shape or the relief portion 39 is formed in the connecting portion 28a in order to enhance the yield strength of the loading cam 12a, there arises a problem that the inside-diameter-side projecting portion 34 can drop down into the relief portion 39 (see FIG. 6C) or the inside-diameter-side projecting portion 34 can interfere with the connecting portion 28a to thereby make it difficult to maintain the attitude of the retainer 7.

As the shape of the retainer 7, conventionally, there are known various shapes (see JP-A-8-200463, JP-A-11-193856, and JP-A-11-63165). However, there has not been proposed yet a retainer having such a shape that can prevent the inside-diameter-side projecting portions 34 from interfering with relief portions 39 or connecting portions 28a.

SUMMARY OF THE INVENTION

The present invention aims at eliminating the above drawbacks found in the conventional retainers. Accordingly, it is an object of the present invention to provide a retainer of a loading cam device of a toroidal-type continuously variable transmission which not only can enhance the yield strength of a loading cam but also can maintain the attitude of a retainer main body. In attaining the above object, according to the present invention, there is provided a toroidal-type continuously variable transmission having: an input shaft; an input side disk and an output side disk respectively disposed on the outer periphery of the input shaft, the input side disk including, in the outer surface thereof, a first cam surface formed as an uneven surface extending in the circumferential direction of the input side disk; and a loading cam device interposed between the input side and output side disks and comprising: a loading cam including, in one side surface thereof, a second cam surface formed as an uneven surface extending in the circumferential direction thereof and rotatable together with the input shaft; a plurality of rollers interposed rollably between the first cam surface of the input side disk and the second cam surface of the loading cam; and a retainer for supporting the rollers, the retainer including a retainer main body having a circular-shaped fitting hole to be fitted with the loading cam, and inside-diameter side projecting portions disposed on a retainer main body for maintaining the attitude of the retainer main body, wherein inside diameters of portions of the fitting hole corresponding to the inside-diameter side projecting portions are larger than that of the remaining portions of the fitting hole.

In the above construction, it is preferable that the loading cam includes a boss portion, the fitting hole of the retainer being fitted with the boss portion of the loading cam.

Therefore, according to the present invention, since the projecting portions can be shifted further by the difference of the inside diameter than in the conventional retainers, even in case where the predetermined portions of the fit portion of the loading cam to be fitted with the fitting hole are respectively formed in an arc shape or relief portions are respectively formed in the present predetermined portions in order to enhance the yield strength of the loading cam, it is possible not only to prevent the projecting portions from dropping down into the relief portions but also to prevent the projecting portions from interfering with the arc-shaped portions. That is, the present invention not only can enhance the yield strength of the loading cam but also can maintain the attitude of the retainer.

DETAILED DESCRIPTION OF THE PREFERRED EMBODIMENTS

Now, description will be given below of the mode for carrying out the present invention with reference to the accompanying drawings. By the way, the characteristic point of the present invention lies in an improvement in the shape of a retainer included, in a loading cam device and the remaining structures and operations of the present invention are similar to the previously described conventional structures and operations. Therefore, description will be given below only of the characteristic portions of the present invention, while the remaining portions of the present invention are given the same designations as in FIGS. 4 to 6 and thus the detailed description thereof is omitted here.

Figure 1A:
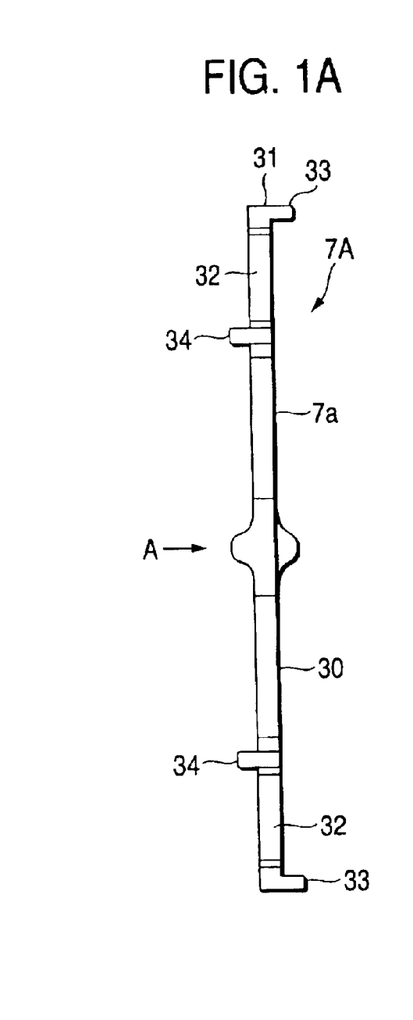
FIG. 1A is a longitudinal side view of a retainer according to a first embodiment of the present invention.
Figure 1B:
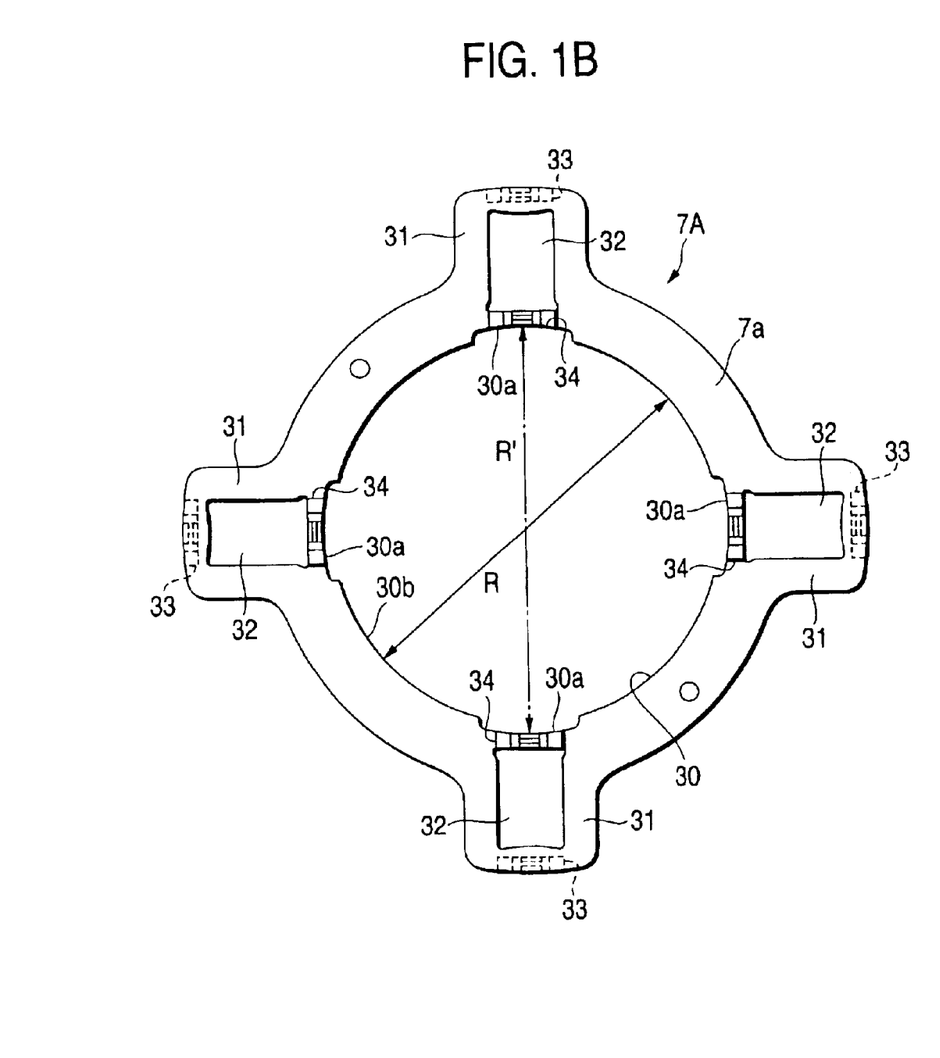
FIG. 1B is a view of the retainer taken along the arrow mark A shown in FIG. 1A.

FIGS. 1A and 1B shows a retainer 7A of a loading cam device 12 according to an embodiment of the present invention. As shown in FIGS. 1A and 1B, in the retainer 7A according to the present embodiment, a circular-shaped fitting hole 30 to be fitted with the boss portion 28 of a loading cam 12a is formed in the following manner: that is, only the inside diameter R' of such portions 30a of the fitting hole 30 that correspond to projecting portions 31 and on which inside-diameter-side projecting portions 34 are disposed (that is, the portions corresponding to the portions of the retainer main body 7a on which the inside-diameter-side projecting portions 34 are disposed) is set larger than the inside diameter R of the other remaining portions 30b of the fitting hole 30; and thus, the inside-diameter-side projecting portions 34 can be shifted further outwardly in the diameter direction by such difference of the inside diameter than the conventional retainer.

Figure 2:
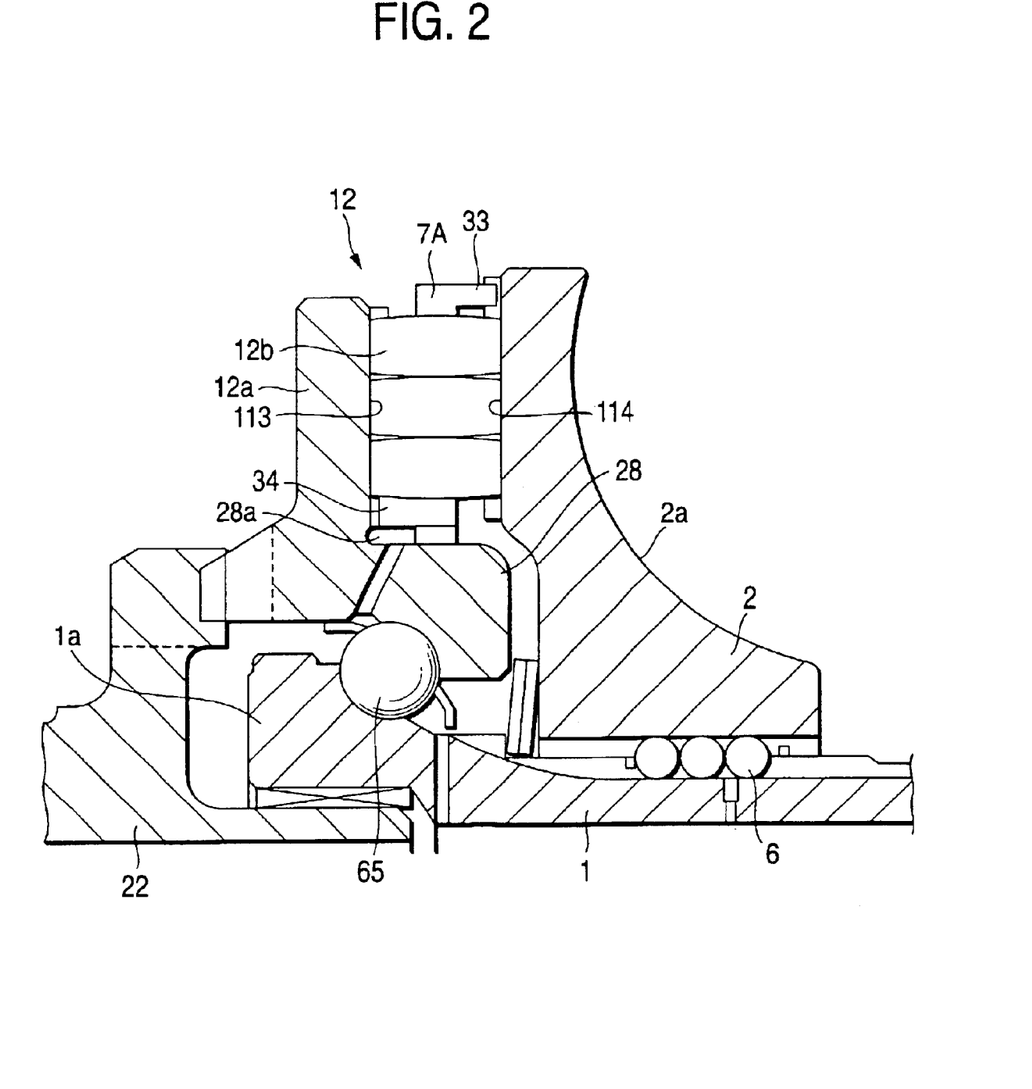
FIG. 2 is an enlarged section view of the main portions of the retainer shown in FIGS. 1A and 1B and a loading cam device, showing a state in which the retainer is incorporated into the loading cam device.
Figure 3A:
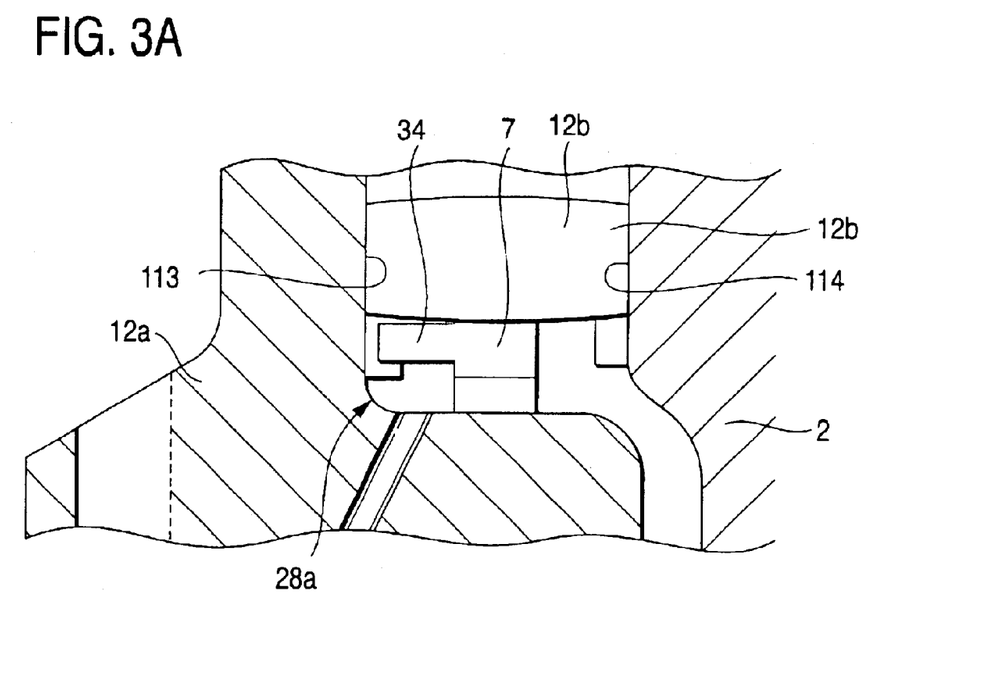
FIGS. 3A and 3B are section views of the periphery of the connecting portion of a loading cam employed in the loading cam device shown in FIG. 2.
Figure 3B:
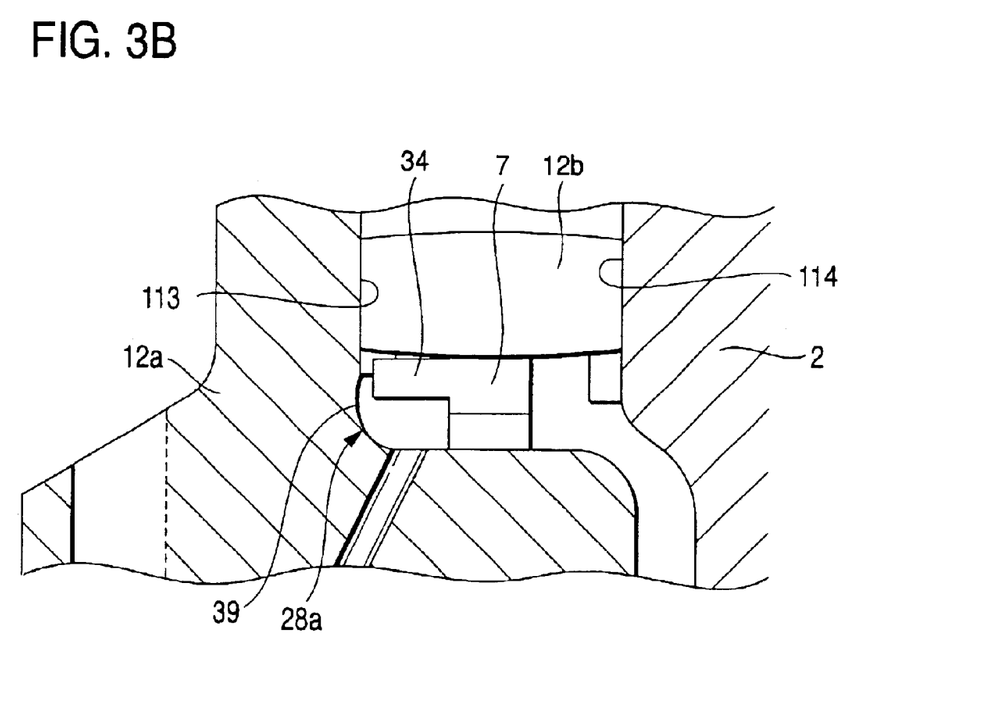

According to the above structure, the retainer 7A can be easily molded or carried out the plastic processing in such a manner that the inside-diameter-side projecting portions 34 can be disposed at arbitrary diameter-direction outside positions. As shown in FIG. 2, when the retainer 7A is incorporated into the loading cam device 12, the inside-diameter-side projecting portions 34 can be prevented from dropping down into the relief portions 39 (see FIG. 3B) or can be prevented from interfering with the connecting portions 28a (see FIG. 3A), thereby being able to maintain the attitude of the retainer 7A positively. In other words, since the inside-diameter-side projecting portions 34 are prevented from dropping down into the relief portions 39 or interfering with connecting portions 28a, the connecting portions 28a can be formed in an arc-like shape or arc-shaped relief portions 39 can be formed in the connecting portions 28a, thereby being able to enhance the yield strength of the connecting portions 28a. That is, according to the present embodiment, not only the yield strength of the loading cam 12a can be enhanced but also the attitude of the retainer 7A can be maintained.

Figure 7A:
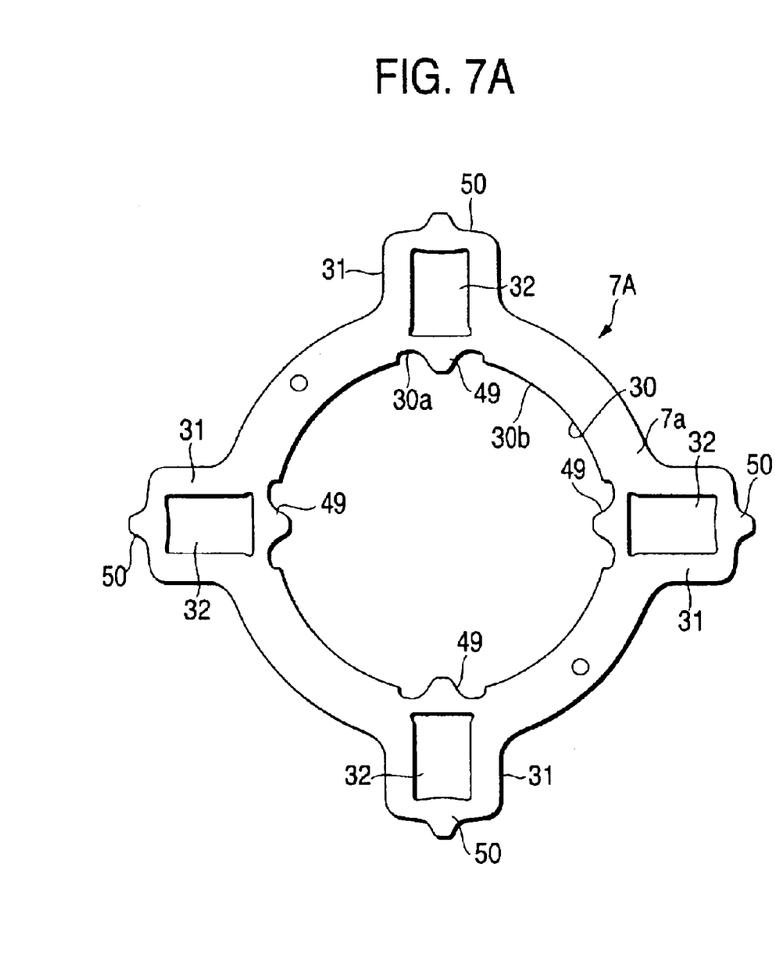
Figure 7B:
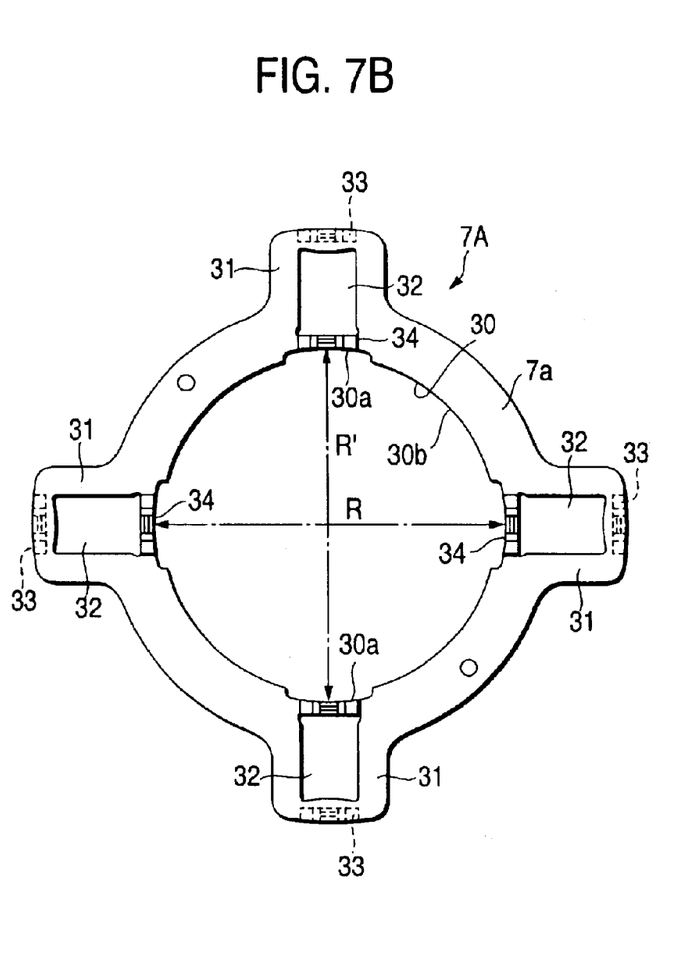

By the way, FIGS. 7A and 7B show the process for molding the retainer 7A. In the present molding process, after the retainer main body 7a is worked by punching a blank member (FIG. 7A), the inside projecting portions 49, 50 of the retainer main body 7a, which are formed in the punching operation, are borne down on (bent) to thereby form (plastically form) the inside-diameter-side projecting portions 34 and outside-diameter-side projecting portions 33 (FIG. 7B).

As has been described heretofore, according to the present invention, since the projecting portions can be shifted further outwardly in the diameter direction by the inside diameter difference of the fitting hole than the conventional retainer, even in case where the predetermined portions of the fitting portion of the loading cam to be fitted with the fitting hole of the retainer in order to enhance the yield strength of the loading cam are formed in an arc-like shape, or in case where the relief portions are formed in such predetermined portions in order to enhance the yield strength of the loading cam, the projecting portions can be prevented from dropping down into the relief portions or from interfering with the arc-shaped portions. That is, while enhancing the yield strength of the loading cam, the attitude of the retainer can be maintained.

What is claimed is:

1. A continuously variable transmission comprising:
    an input shaft;
    an input side disk and an output side disk respectively disposed on the outer periphery of the input shaft, the input side disk including, in the outer surface thereof, a first cam surface formed as an uneven surface extending in the circumferential direction of the input side disks and
    a loading cam device interposed between the input side and output side disk and comprising:
    a loading cam including, in one side surface thereof, a second cam surface formed as an uneven surface extending in the circumferential direction thereof and rotatable together with the input shaft;
    a plurality of rollers interposed rollably between the first cam surface of the input side disk and the second cam surface of the loading cam; and
    a retainer for supporting the rollers, the retainer including a retainer main body having a circular-shaped fitting hole to be fitted with the loading cam, and inside-diameter side projecting portions disposed on a retainer main body for maintaining the attitude of the retainer main body,
    wherein inside diameters of portions of the fitting hole corresponding to the inside-diameter side projecting portions are larger than that of the remaining portions of the fitting hole.

2. The continuously variable transmission as set forth in claim 1, wherein the loading cam includes a boss portion, the fitting hole of the retainer being fitted with the boss portion of the loading cam.

* * * * *